United States Patent
Suzuki et al.

(10) Patent No.: US 7,012,775 B2
(45) Date of Patent: Mar. 14, 2006

(54) WRITER FOR HEAD POSITIONING INFORMATION OVER RECORDING MEDIUM

(75) Inventors: Hiroyuki Suzuki, Kawasaki (JP);
Hitoshi Komoriya, Kawasaki (JP);
Yutaka Nakamura, Kawasaki (JP);
Takao Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 09/972,065

(22) Filed: Oct. 5, 2001

(65) Prior Publication Data
US 2003/0021051 A1 Jan. 30, 2003

(30) Foreign Application Priority Data
Jul. 30, 2001 (JP) .............................. 2001-230301

(51) Int. Cl.
*G11B 21/02* (2006.01)
*G11B 15/12* (2006.01)
*G11B 15/46* (2006.01)
*G11B 5/29* (2006.01)

(52) U.S. Cl. ..................... 360/75; 360/62; 360/73.03; 360/121

(58) Field of Classification Search ................. 360/53, 360/75, 77.07, 77.04, 234.7, 73.01, 77.06, 360/77.11, 78.01, 121, 317
See application file for complete search history.

(56) References Cited

U.S. PATENT DOCUMENTS

| | | | |
|---|---|---|---|
| 4,251,839 A | | 2/1981 | Yamamoto et al. |
| 5,010,430 A | * | 4/1991 | Yamada et al. .......... 360/235.4 |
| 5,325,245 A | * | 6/1994 | Shimizu et al. .......... 360/77.08 |
| 5,500,776 A | | 3/1996 | Smith |
| 5,606,469 A | | 2/1997 | Kosugi et al. |
| 5,757,574 A | * | 5/1998 | Chainer et al. ................ 360/75 |
| 5,920,447 A | * | 7/1999 | Sakata et al. ................ 360/121 |
| 6,587,293 B1 | * | 7/2003 | Ding et al. .................... 360/51 |
| 6,633,451 B1 | * | 10/2003 | Chainer et al. ................ 360/75 |

FOREIGN PATENT DOCUMENTS

| | | | |
|---|---|---|---|
| EP | 0 267 669 | | 5/1988 |
| EP | 0 428 325 | | 5/1991 |
| JP | 56-114124 | | 9/1981 |
| JP | 05-002728 | | 1/1993 |
| JP | 06103509 A | * | 4/1994 |
| JP | 11-066777 | | 3/1999 |

* cited by examiner

*Primary Examiner*—David Hudspeth
*Assistant Examiner*—Daniell L. Negrón
(74) *Attorney, Agent, or Firm*—Greer, Burns & Crain, Ltd.

(57) ABSTRACT

A writer for head positioning information, or a so-called servo track writer allows the read gap to follow a track which has been established on a recording medium or disk. As long as the read gap keeps following the existing track, the write gap is allowed to move along a path extending in parallel with the existing track. The write gap is utilized to write head positioning or servo information into the recording medium along the path. Even when the recording medium suffers from vibration or the like, the read gap can follow the track. The head positioning information can thus be written into the recording medium so as to establish a head positioning pattern at a higher positional accuracy.

16 Claims, 10 Drawing Sheets

WRITER FOR HEAD POSITIONING INFORMATION OVER RECORDING MEDIUM

BACKGROUND OF THE INVENTION

1. Field of the Invention

The present invention relates to a recording medium such as a magnetic recording disk incorporated in a hard disk drive (HDD), for example. In particular, the invention relates to a writer or a method for writing head positioning or servo information into the recording medium.

2. Description of the Prior Art

A writing apparatus of head positioning information, such as a so-called servo track writer, is designed to utilize a magnetic head in writing head positioning or servo information into a magnetic recording disk. The magnetic head is usually mounted on a head slider. When the magnetic head finishes writing of the servo information for a single track, the head slider is forced to shift in the radial direction of the magnetic recording disk by a predetermined displacement amount. This movement serves to establish a predetermined interval or track pitch between adjacent tracks.

When the servo information is to be written into the magnetic recording disk, a spindle motor drives the magnetic recording disk for rotation about the driving shaft. The spindle motor inevitably suffers from a small vibration or eccentricity of the driving shaft during the rotation of the magnetic recording disk. This small vibration or eccentricity causes the magnetic head to deviate from the set circular orbit on the magnetic recording disk. The servo patterns are thus established on the magnetic recording disk off the expected circular track.

The interval or track pitch is expected to get reduced between adjacent tracks on the magnetic recording disk in the future. If the track pitch gets reduced, the aforementioned deviation of the magnetic head off the set orbit is supposed to lead to interference of the servo patterns, which are expected to establish the adjacent tracks. The later written servo pattern serves to erase the earlier written servo pattern. The interference of the servo patterns in this manner makes it impossible to correctly establish tracks on the magnetic recording disk based on the written servo patterns. Information data thus cannot correctly be written into the magnetic recording disk.

SUMMARY OF THE INVENTION

It is accordingly an object of the present invention to provide a writer or a method capable of reliably writing head positioning information onto a recording medium without causing any interference of head positioning patterns.

According to a first aspect of the present invention, there is provided a writer for head positioning information, comprising: a head slider; a read head mounted on the head slider and reading head positioning signals out of a head positioning pattern over a recording medium; a write head mounted on the head slider and writing the head positioning information into the recording medium so as to establish a new head positioning pattern; and a positioning mechanism connected to the head slider and positioning the head slider based on the head positioning signals read with the read head.

With the above-mentioned writer, the head slider can be positioned with respect to the recording medium based on a track which has been established on the recording medium. Even when the recording medium suffers from displacement, vibration, or the like, for example, a predetermined relative positional relationship can reliably be maintained between the recording medium and the head slider. Accordingly, the new head positioning pattern can be established on the recording medium at a higher positional accuracy. Any superposition or interference can thus be prevented between the head positioning patterns.

The writer may further comprise a spindle motor capable of driving the recording medium for rotation around a rotation axis. The writer of this type contributes to establishment of concentric circular head positioning patterns on the recording medium or disk, for example. Even if the rotating driving shaft suffers from any eccentricity or vibration in the spindle motor, the new head positioning pattern can still be established on the recording medium at a higher positional accuracy.

In this case, it is preferable that the positioning mechanism moves the head slider on a straight line. The linear movement of this type enables movement of the head slider right on the radial line of the recording medium or disk. The new head positioning pattern can be established on the recording medium or disk at a still higher positional accuracy.

According to a second aspect of the present invention, there is provided a head slider comprising: a slider body defining a medium-opposed surface; a read head element exposing a read gap at the medium-opposed surface on a first zone extending straight from a leading end to a trailing end; and a write head element exposing a write gap at the medium-opposed surface on a second zone extending straight from the leading end to the trailing end in parallel with the first zone.

The head slider of this type may be incorporated in the aforementioned writer for head positioning information. In this case, when the read head element follows a track which has been established on the recording medium, the write head element is allowed to move along a path extending in parallel with the track. The new head positioning pattern can be established on the recording medium along the path. As long as the read head element keeps following the track, the write head element cannot deviate from the path. Since the location of the path can be determined based on the existing track, the new head positioning pattern can be positioned, relative to the existing track, at a higher accuracy. Any superposition or interference can thus be prevented between the head positioning patterns. Moreover, a constant track pitch can be maintained between the tracks.

According to a third aspect of the present invention, there is provided a head slider comprising: a slider body defining a medium-opposed surface; and a head array exposing a plurality of write gaps at the medium-opposed surface.

The head slider of this type may be incorporated in the aforementioned writer for head positioning information. In this case, the write gaps are allowed to move along paths extending in parallel on the recording medium, respectively. The new head positioning patterns can be established on the recording medium along the paths, respectively. Arrangement or location of the paths serves to determine the relative positional relationship between the new head positioning patterns, namely, strings of the head positioning signals. Any superposition or interference can thus be prevented between the head positioning patterns. The respective ends of the write gaps may be defined by a plurality of straight datum lines extending in parallel from the leading end to the trailing end on the head slider. The datum lines may equally be spaced from one another. The space between the datum lines serves to determine the width of the new head positioning patterns.

The head slider of the third aspect may further comprising a read head element exposing a read gap out of the medium-opposed surface of the slider body. When the read gap follows a track which has been established on the recording medium, the write gaps are allowed to move along paths extending in parallel with the track, respectively. The new head positioning patterns can be established on the recording medium along the track so as to define strings of head positioning signals. The head positioning information of a so-called phase type can thus be accomplished in this manner. As long as the read gap keeps following the track, the write gaps cannot deviate from the corresponding paths. Since the location of the paths can be determined based on the existing track, the new head positioning patterns can be positioned, relative to the existing track, at a higher accuracy. Any superposition or interference can thus be prevented between the head positioning patterns. Moreover, a constant track pitch can be maintained between the tracks. In this case, writing of the head positioning information may be switched between the paths while the read gap follows the existing track from its beginning to its end, or be switched between the paths after the read gap has followed the existing track from its beginning to its end.

When the aforementioned writer is to be utilized, a datum track should be established on the recording medium. The read gap first follows the datum track. Accordingly, a new track can be established on the recording medium adjacent the datum track. The read gap is then allowed to follow the new track. A new track can sequentially be established adjacent the existing track in this way. Accordingly, numbers of the tracks can finally be established on the recording medium.

The aforementioned writer may be employed to write head positioning information for establishing the datum track. In this case, the writer preferably includes a rotational speed controlling circuit capable of switching rotation speed of the spindle motor between at least two rotational speeds. In general, when the rotation speed of the spindle motor is increased, the driving shaft of the spindle motor tends to suffer from an increased vibration or eccentricity. However, the aforementioned writer allows the write gap to write head positioning information while the read gap is allowed to reliably follow the existing track. The new head positioning patterns can be established on the recording medium at a higher accuracy irrespective of the vibration or eccentricity of the driving shaft even when the rotation speed of the spindle motor is set at a higher speed. On the other hand, when the datum track is to be established on the recording medium, no tracks exist on the recording medium. It is impossible to utilize the read gap to position the write gap. Eccentricity or vibration of the driving shaft should be suppressed to the utmost in the spindle motor. If the rotation speed of the spindle motor is relatively reduced, the head positioning information can be written into the recording medium at a still higher accuracy. Alternatively, any other writing apparatus may be employed to write the head positioning information establishing the datum track.

In any event, the aforementioned writer may further comprise a verifying circuit capable of detecting a defect of the head positioning information based on a detection signal from the read gap. When the read gap follows a new track which has been established on the recording medium, the verifying circuit may contribute to detection of a defect existing in the head positioning pattern expected to establish the new track. If any defect is found in the head positioning pattern, the write gap may be employed to overwrite the head positioning information along the path for the new track as described above.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
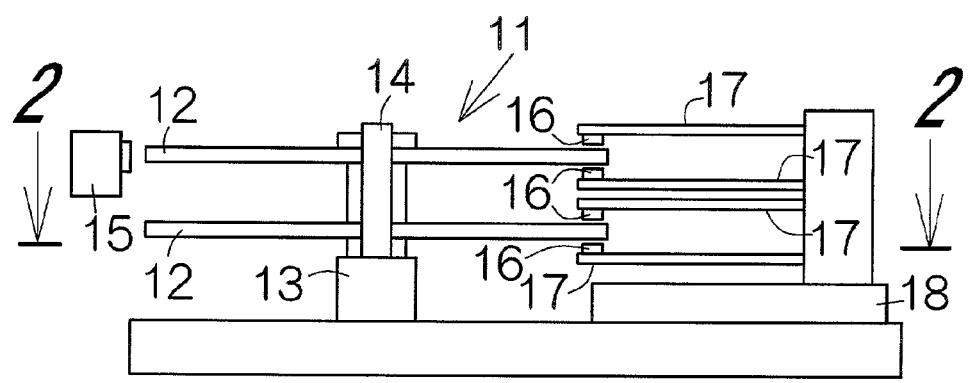
FIG. 1 is a side view schematically illustrating a servo track writer as a writer for head positioning information.

FIG. 1 schematically illustrates a writer of head positioning information, namely, a servo track writer 11. The servo track writer 11 includes a spindle motor 13 receiving one or more recording media such as magnetic recording disks 12, for example. The spindle motor 13 is designed to drive the magnetic recording disks 12 around a driving shaft 14. The respective magnetic recording disks 12 are allowed to rotate within parallel horizontal planes.

An eccentricity sensor 15 is connected to the driving shaft 14 of the spindle motor 13. The eccentricity sensor 15 is designed to detect the amount of eccentricity or vibration of the rotating driving shaft 14. The eccentricity sensor 15 may comprise a noncontacting vibration sensor such as a laser range finder, a capacitance type range finder, and the like. In this case, the eccentricity sensor 15 is designed to detect displacement amount of the magnetic recording disks 12 in parallel with the horizontal plane.

Flying head sliders 16 are disposed at positions opposed to front and back surfaces of the magnetic recording disks 12, respectively. The flying head sliders 16 are supported on linear movement arms 17. Elastic members, such as elastic suspensions and gimbal springs, not shown, are interposed between the individual flying head sliders 16 and the linear movement arms 17. The elastic members utilized to allow the flying head sliders 16 to fly above the front and back surfaces of the rotating magnetic recording disks 12 by a predetermined constant flying height.

Figure 2:
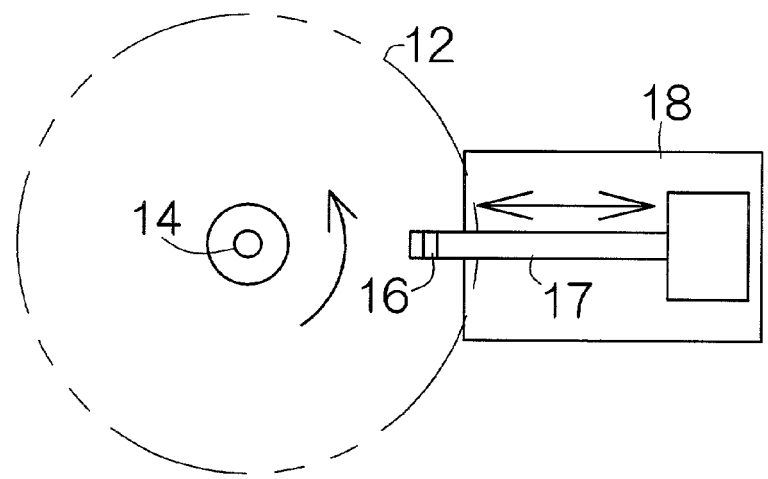
FIG. 2 is a sectional view taken along the line 2—2 in FIG. 1.

A positioning mechanism 18 is connected to the linear movement arms 17. The positioning mechanism 18 is designed to position the flying head sliders 16 with respect to the magnetic recording disks 12. The positioning mechanism 18 is allowed to move the linear movement arms 17 along the horizontal plane. As shown in FIG. 2, for example, the movement of the linear movement arms 17 causes the flying head sliders 16 to move on corresponding straight lines in the radial direction of the magnetic recording disks 12.

Figure 3:
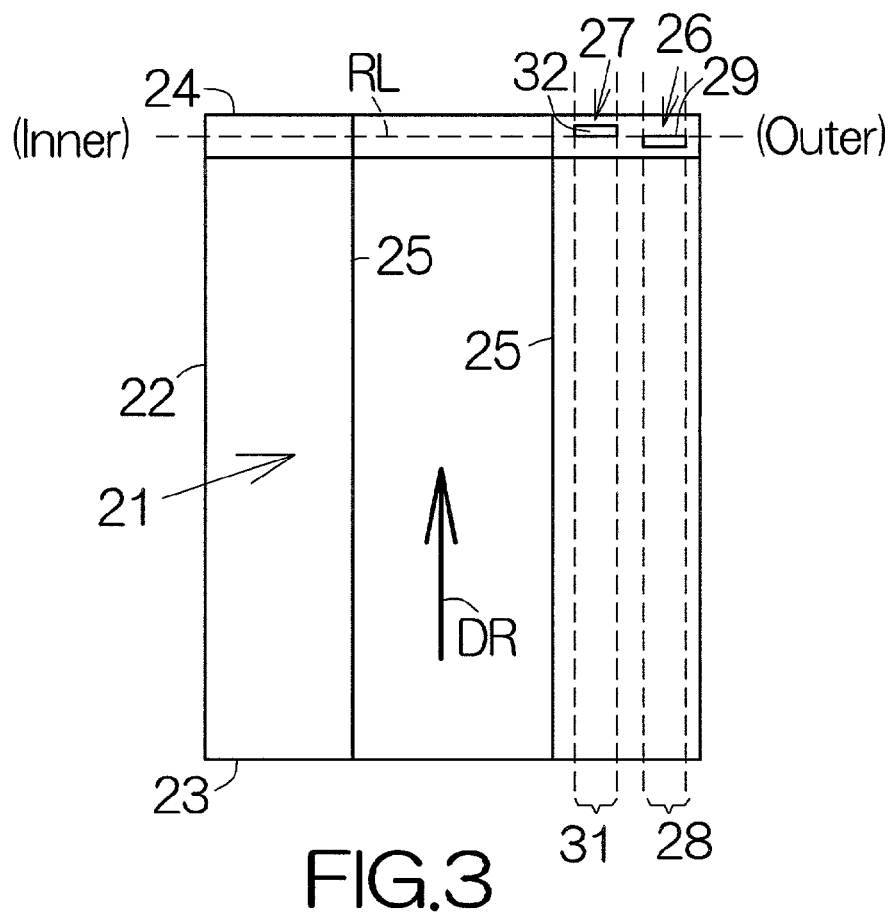
FIG. 3 is an enlarged plan view schematically illustrating the bottom surface of a flying head slider according to a specific example.

As is apparent from FIG. 3, the flying head slider 16 includes a slider body 22 of a flat rectangular parallelepiped. The slider body 22 is designed to get opposed to the magnetic recording disk 12 at a medium-opposed surface or bottom surface 21. For example, a pair of rails 25, 25 are formed to extend over the bottom surface 21 from the inflow or leading end 23 to the outflow or trailing end 24 of the slider body 22. Air bearing surfaces (ABSs) are defined on the top surfaces of the rails 25, 25. The term "leading" and "trailing" can be defined based on the direction DR of rotation of the magnetic recording disk 12.

A read head 26 and a write head 27 are mounted on the slider body 22. The read head 26 may comprise a magnetoresistive (MR) element exposing a read gap 29 out of the air bearing surface in a first longitudinal zone 28 extending straight from the leading end 23 to the trailing end 24, for example. Linear longitudinal boundaries of the first longitudinal zone 28 serve to define the inner and outer ends of the read gap 29. The term "inner" and "outer" can be defined based on the radial direction RL of the magnetic recording disk 12.

The write head 27 may comprise an inductive write head element or a so-called thin film magnetic head exposing a write gap 32 out of the air bearing surface in a second longitudinal zone 31 extending straight from the leading end 23 to the trailing end 24 in parallel with the first zone 28, for example. Linear longitudinal boundaries of the second longitudinal zone 31 serve to define the inner and outer ends of the write gap 32. When the positioning mechanism 18 causes the linear movement arm 17 to move in the radial direction RL of the magnetic recording disk 12, the read gap 29 and the write gap 32 are allowed to linearly move on the radial line of the magnetic recording disk 12 which is mounted on the spindle motor 13. The first and second longitudinal zones 28, 31 on the flying head slider 16 are preferably set to intersect the radial line of the magnetic recording disk 12 at right angles.

Figure 4:
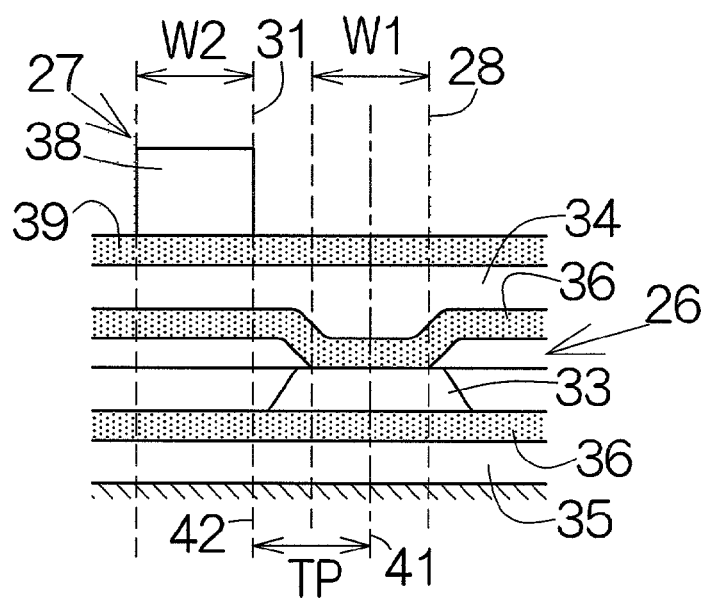
FIG. 4 is an enlarged partial plan view of the bottom surface for illustrating a read head and a write head in detail.

As shown in FIG. 4, the read head 26 includes a magnetoresistive (MR) film 33 capable of varying its electric resistance in response to the direction of the magnetic field applied from the magnetic recording disk 12. The magnetoresistive film 33 may be a giant magnetoresistive (GMR) film such as a spin valve film, or a tunnel-junction magnetoresistive (TMR) film, for example. The magnetoresistive film 33 is interposed between upper and lower magnetic shield layers 34, 35. Non-magnetic layers 36, 36 are respectively interposed between the magnetoresistive film 33 and the magnetic shield layers 34, 35. In this case, the lateral length or width W1 of the read gap 29 or first longitudinal zone 28 can be defined by the lateral dimension of the primary range which is substantially related to detection of the applied magnetic field in the magnetoresistive film 33. The lateral dimension of the primary range can be measured in the radial direction RL of the magnetic recording disk 12.

The write head 27 includes an upper magnetic pole 38 opposed to the upper magnetic shield layer 34 of the read head 26 or magnetoresistive element. Specifically, the upper magnetic shield layer 34 of the magnetoresistive element is allowed to also serve as a lower magnetic pole of the write head 27 or thin film magnetic head. A non-magnetic gap layer 39 is interposed between the upper magnetic pole 38 and the upper magnetic shield layer 34. The upper magnetic pole 38 and the upper magnetic shield layer 34 are connected to each other through a magnetic piece, not shown, penetrating through the central area of a thin film coil pattern, not shown. In this case, the lateral length or width W2 of the write gap 32 or second longitudinal zone 31 can be defined by the lateral dimension of the primary range which is substantially related to formation of a magnetic field for recordation in the upper magnetic pole 38. The lateral dimension of the primary range can be measured in the radial direction RL of the magnetic recording disk 12. The lateral dimension of the primary range for the write head 27 may be set identical to the aforementioned lateral dimension of the primary range for the read head 26, for example.

The central line 41 of the first longitudinal zone 28 defining the read gap 29 is allowed to extend in parallel with the boundary line 42 of the second longitudinal zone 31 for defining the outer end of the write gap 32. The space or distance between the central line 41 and the boundary line 42 thus corresponds to an interval between the adjacent tracks established on the magnetic recording disk 12, in other words, to a track pitch TP, as described later in detail. The combination of the read head 26 and the write head 27 can be employed to establish servo patterns of a so-called amplitude type.

Figure 5:
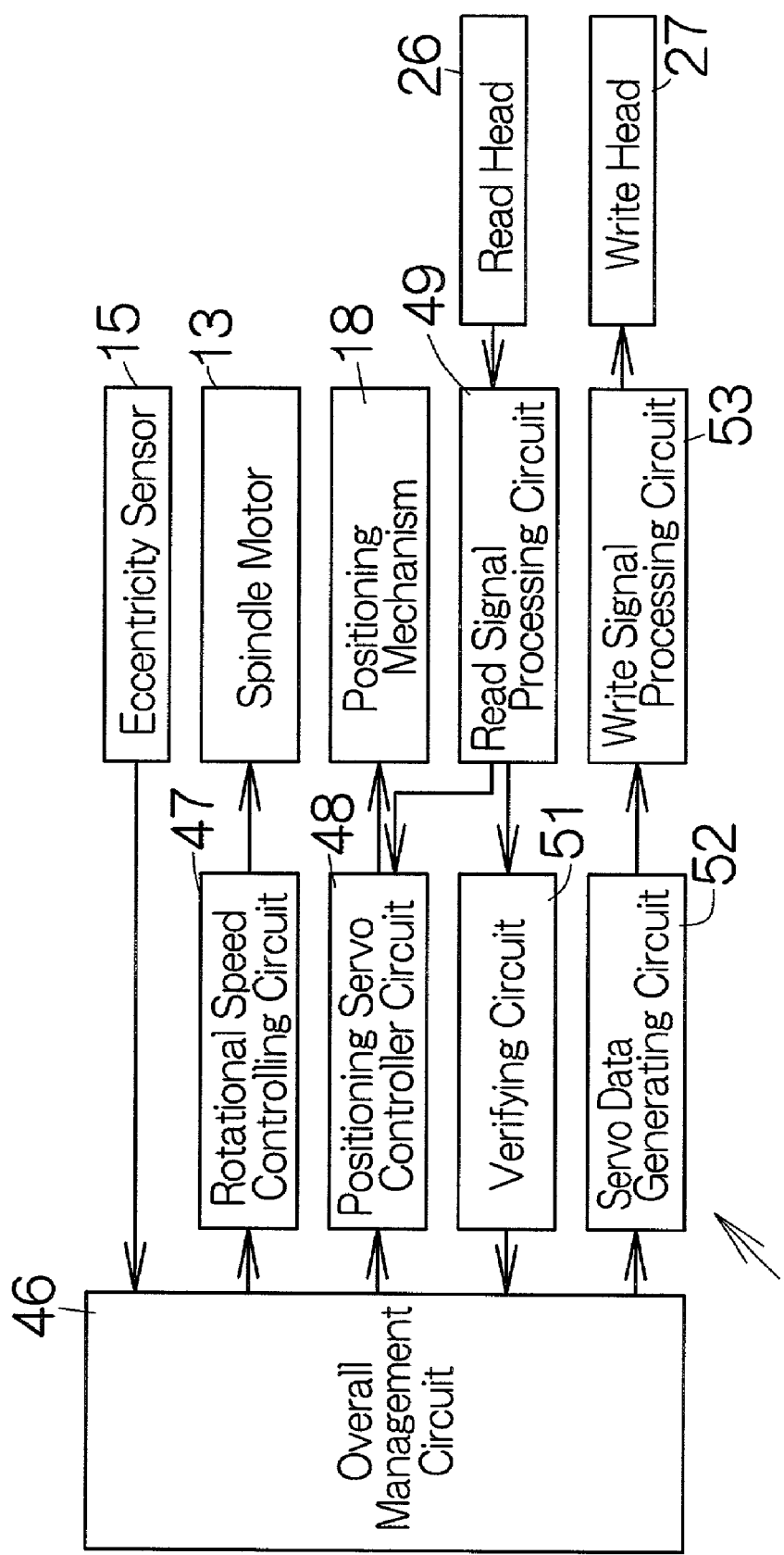
FIG. 5 is a block diagram schematically illustrating the structure of a control system for the servo track writer or a controller.

FIG. 5 is a block diagram schematically illustrating a control system or a controller 45 for the servo track writer 11. The controller 45 includes an overall management circuit 46. The overall management circuit 46 may comprise a microprocessor unit (MPU) capable of executing operation programs taken out of any storage medium, for example.

A rotational speed controlling circuit 47 is connected to the overall management circuit 46. The rotational speed controlling circuit 47 is designed to control the rotation speed of the spindle motor 13. The overall management circuit 46 generates an instruction signal designating a rotation speed of the spindle motor 13. The overall management circuit 46 is allowed to refer to the output of the eccentricity sensor 15 when generating the instruction signal. The rotational speed controlling circuit 47 supplies an electric current of a specific value to the spindle motor 13 in accordance with the rotation speed specified in the instruction signal received from the overall management circuit 46.

A positioning servo controller circuit 48 is connected to the overall management circuit 46. The positioning servo controller circuit 48 is designed to generate an instruction signal designating the control quantity of the positioning mechanism 18, namely, the displacement amount of the flying head slider 16. The positioning mechanism 18 operates to drive the linear movement arm 17 along the radial direction of the magnetic recording disk 12 in accordance with the control quantity specified in the instruction signal. The positioning servo controller circuit 48 is allowed to refer to the output of a read signal processing circuit 49 when generating the instruction signal. The read signal processing circuit 49 is designed to generate an electric signal of a magnitude corresponding to the intensity of the magnetic field acting on the magnetoresistive film 33. The positioning servo controller circuit 48 establishes a servo control of the flying head slider 16 based on the servo information on the magnetic recording disk 12 in this manner.

A verifying circuit 51 is connected to the overall management circuit 46. The verifying circuit 51 is designed to detect a defect of servo patterns applying the magnetic field to the read head 26. The verifying circuit 51 is allowed to refer to the output of the read signal processing circuit 49 in detection of a defect.

A servo data generating circuit 52 is connected to the overall management circuit 46. The servo data generating circuit 52 is designed to generate servo data in accordance with a predetermined rule. The servo data may comprise a combination or sequence of binary data, for example. The generated servo data is supplied to a write signal processing circuit 53. The write signal processing circuit 53 is designed to output to the write head 27 an electric signal designating the binary data included in the servo data.

Next, a detailed description will be made on the operation of the servo track writer 11. The magnetic recording disks 12 are mounted on the servo track writer 11. The overall management circuit 46 instructs the spindle motor 13 to rotate. The overall management circuit 46 sets the rotation speed of the spindle motor 13 at the minimum vibration rotation speed. The rotational speed controlling circuit 47 thus receives from the overall management circuit 46 the instruction signal designating the minimum vibration rotation speed. The magnetic recording disks 12 are thus allowed to rotate at the designated rotation speed.

The aforementioned minimum vibration rotation speed can be obtained at the servo track writer 11, for example. In this case, the spindle motor 13 is controlled to start rotating in the servo track writer 11 after receiving the magnetic recording disks 12. The rotational speed controlling circuit 47 controls the spindle motor 13 to continuously increase the rotation speed from the minimum or bottom driven speed. The eccentricity sensor 15 keeps detecting the vibration or eccentricity of the driving shaft 14 during the rotation of the magnetic recording disks 12. When the vibration of the minimum amount has been detected, the rotation speed of the spindle motor 13 is recorded. The minimum vibration rotation speed can be found in this manner. Note that the rotational speed controlling circuit 47 may instead controls the spindle motor 13 to continuously reduce the rotation speed from the maximum driven speed. The rotation speed of the spindle motor 13 may be increased or reduced not only continuously but also stepwise.

Thereafter, the overall management circuit 46 operates to position the flying head slider 16 at the outermost position on the magnetic recording disk 12. The positioning servo controller circuit 48 generates a specific instruction signal in which the control quantity of the positioning mechanism 18 is designated for positioning the flying head slider 16 at the outermost position. The positioning mechanism 18 serves to drive the linear movement arm 17 based on the control quantity designated in the instruction signal. Positioning of the flying head slider 16 is thus completed. The flying head slider 16 is allowed to receive airflow generated along the surface of the rotating magnetic recording disk 12 so as to fly above the surface of the magnetic recording disk 12.

The overall management circuit 46 then operates to realize writing of the servo information for establishing a datum track on the magnetic recording disk 12. The servo data generating circuit 52 generates a servo data corresponding to servo patterns expected to establish the datum track. The generated servo data is supplied to the write signal processing circuit 53. The write signal processing circuit 53 provides the write head 27 with electric signals designating the binary data included in the servo data. The write head 27 is forced to write into the magnetic recording disk 12 the binary magnetic data corresponding to the supplied electric signals.

Figure 6:
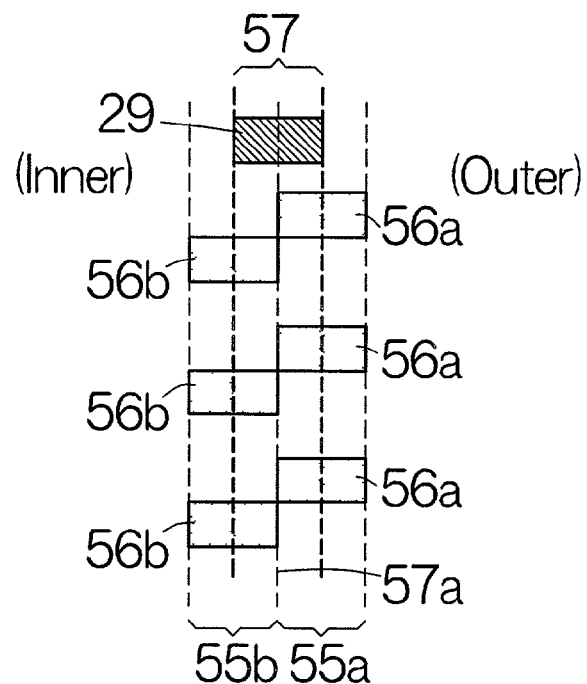
FIG. 6 is a schematic view illustrating a servo pattern establishing a datum track.

As shown in FIG. 6, servo signal blocks 56a, 56b are established on the recording disk 12 along a pair of parallel paths 55a, 55b extending side by side. The servo signal blocks 56a, 56b serve to define a single datum track 57 extending over both the paths 55a, 55b. The centerline 57a of the datum track 57 corresponds to the boundary between the paths 55a, 55b. The width of the servo signal blocks 56a, 56b is determined based on the width W2 of the write gap 32. Since the eccentricity or vibration of the driving shaft 14 can be suppressed to the utmost at the minimum vibration rotation speed in the spindle motor 13, the servo signal blocks 56a, 56b can be established over the magnetic recording disks 12 at a higher accuracy.

Thereafter, the overall management circuit 46 operates to position the read gap 29 right above the datum track 57. The positioning mechanism 18 drives the linear movement arms 17 based on the control quantity set in the positioning servo controller circuit 48. The rotational speed controlling circuit 47 then sets the rotation speed of the spindle motor 13 at the maximum driven speed, for example. The rotation speed of the spindle motor 13 is thus switched over from the minimum vibration rotation speed to the maximum driven speed. The spindle motor 13 thus drives the magnetic recording disks 12 at the designated rotation speed.

The read head 26 follows the datum track 57 based on the aforementioned servo patterns, namely, two rows of the servo signal blocks 56a, 56b. If the read gap 29 moves right on the datum track 57, the read head 26 is allowed to receive the magnetic fields equally from the servo signal blocks 56a, 56b. On the other hand, if the read gap 29 deviates from the datum track 57 outward in the radial direction of the magnetic recording disk 12, a magnetic field of a larger intensity can be detected from the outer servo signal blocks 56a. The result of this detection is transmitted to the positioning servo controller circuit 48 via the read signal processing circuit 49. The positioning servo controller circuit 48 determines the control quantity of the positioning mechanism 18 based on the difference in intensity between the magnetic fields received from the servo signal blocks 56a, 56b, for example. When the linear movement arm 17 is driven to move by the determined control quantity, it is possible to counteract the deviation of the read head 26 from the datum track 57. To the contrary, if the read gap 29 deviates from the datum track 57 inward, the read gap 29 is allowed to receive the magnetic field of a larger intensity from the inner servo signal blocks 56b. The positioning servo controller circuit 48 operates to designate the control quantity based on the difference in intensity in the aforementioned manner. The deviation of the read head 26 can likewise be counteracted. The positioning servo controller circuit 48 thus realizes a servo control allowing the read gap 29 to accurately follow the datum track 57.

Figure 7:
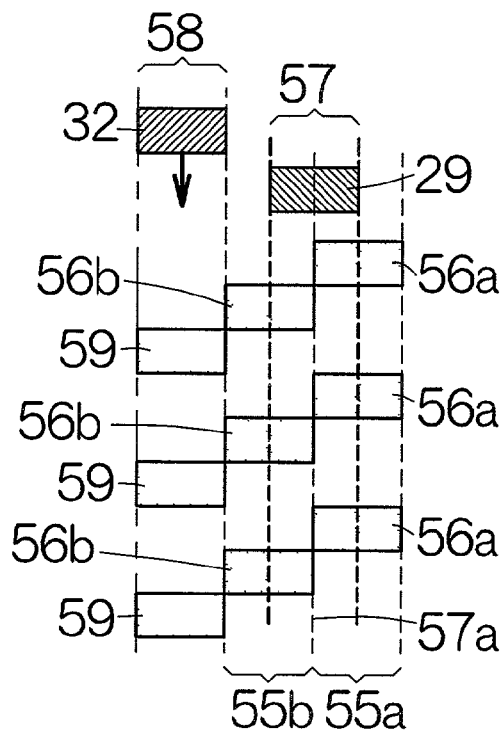
FIG. 7 is a schematic view illustrating establishment of a servo pattern based on the datum track.

While the read gap 29 follows the datum track 57 in the aforementioned manner, the write gap 32 moves along a path 58 extending in parallel with the datum track 57 inside the datum track 57, as shown in FIG. 7. The path 58 is located adjacent the path 55b for the servo signal blocks 56b of the datum track 57. The overall management circuit 46 then operates to establish servo signal blocks 59 which serve to establish a first recording track on the magnetic recording disk 12. The write signal processing circuit 53 provides the write head 27 with electric signals corresponding to the servo data generated in the servo data generating circuit 52. The write head 27 is thus forced to write into the magnetic recording disk 12 the binary magnetic data corresponding to the supplied electric signals.

Figure 8:
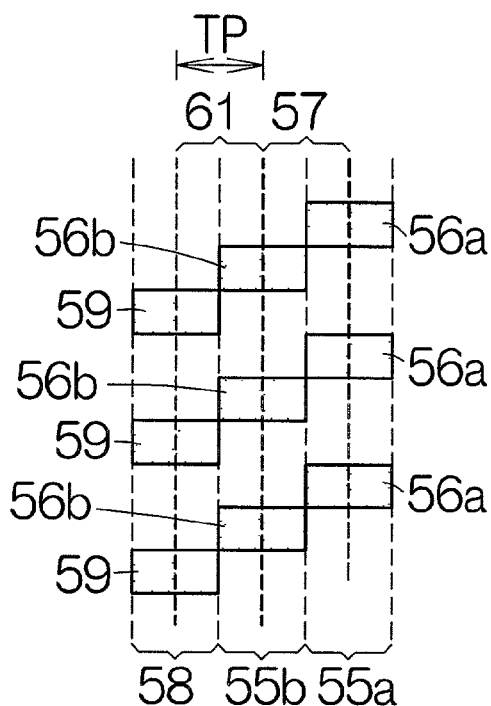
FIG. 8 is a concept view of a first recording track.

In this manner, the servo information is written into the magnetic recording disk 12 so as to establish the servo signal blocks 59 along the path 58 adjacent the path 55b. As is apparent from FIG. 8, two rows of the servo signal blocks 56b, 59 serve to define the first recording track 61 extending over both the paths 55b, 58. The centerline of the first recording track 61 corresponds to the boundary between the paths 55b, 58. The width of the servo signal blocks 59 is determined based on the width W2 of the write gap 32.

In general, when the rotation speed of the spindle motor 13 is increased, the driving shaft 14 of the spindle motor 13 tends to suffer from an increased vibration or eccentricity. However, the read gap 29 is allowed to reliably follow the datum track 57 based on the aforementioned servo control irrespective of the vibration or eccentricity of the driving shaft 14. As long as the servo control is maintained, the write gap 32 is forced to move along the path 58. Since the path 58 is reliably prevented from any superposition or interference over the existing paths 56b, 56a, any superposition or interference cannot happen between the servo signal blocks 56b, 56a, 59. Moreover, if the servo signal blocks 59 can be established over the magnetic recording disk 12 at a higher accuracy irrespective of the vibration or eccentricity of the driving shaft 14, it is possible to reliably keep a constant track pitch TP between the datum track 57 and first recording track 61 adjacent each other.

Figure 9:
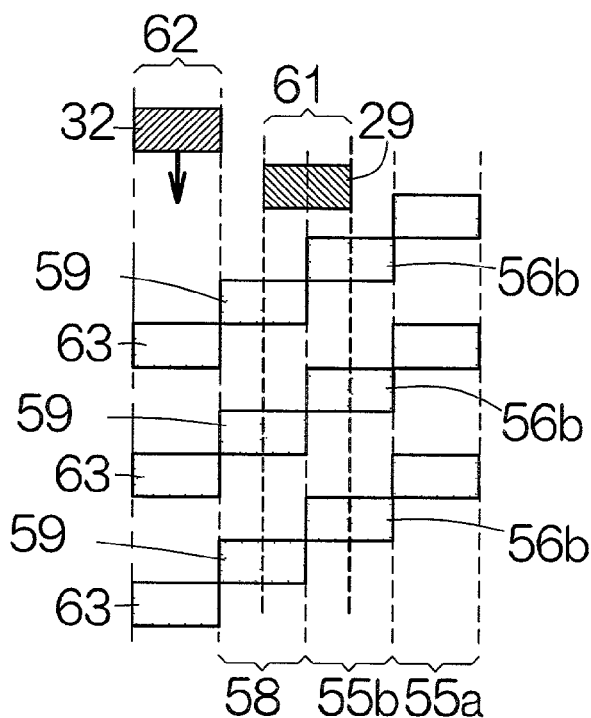
FIG. 9 is a schematic view illustrating establishment of a servo pattern based on the first recording track.

As shown in FIG. 9, the overall management circuit 46 then operates to position the read gap 29 right above the first recording track 61. The rotation speed of the spindle motor 13 is maintained at the maximum driven speed. The read gap 29 is allowed to accurately follow the first recording track 61 based on the servo information, namely, two rows of the servo signal blocks 56b, 59. The write gap 32 is allowed to move along a path 62 newly established adjacent and inside the path 58 in the same manner as described above. In this case, the first recording track 61 serves as the datum track 57. The servo information is written into the magnetic recording medium 12 so as to establish servo signal blocks 63 on the magnetic recording medium 12. In this manner, a plurality of parallel paths 58, 62, . . ., can sequentially be established inside the datum track 57. Any superposition or interference cannot happen between the adjacent paths 58, 62, . . ., over the magnetic recording disk 12. The servo information can correctly be written into the magnetic recording disk 12 along the paths 58, 62, . . ., so as to establish the servo signal blocks 59, 63, . . ., in accordance with a predetermined pattern rule.

When the servo information is written into the magnetic recording disk 12, the read gap 29 keeps reading head positioning signals out of the existing servo patterns. The read signal processing circuit 49 generates an electric signal of a magnitude corresponding to the intensity of the magnetic field applied to the magnetoresistive film 33. The generated electric signal can be supplied to the verifying circuit 51. The verifying circuit 51 operates to compare the servo data extracted from the received electric signal with the servo data generated at the servo data generating circuit 52 when writing the servo information. If the verifying circuit 51 finds an inconsistency, the verifying circuit 51 notifies the overall management circuit 46 of this fact. A defect of the written servo information can be detected in this manner. Detection of a defect can be achieved for every paths 58, 62, . . ., over the magnetic recording disk 12.

Now, if a defect of the servo signal block 59 has been found along the first recording track 61, the overall management circuit 46 operates to position the read gap 29 again on the datum track 57 prior to writing of the servo information related to establishment of the servo signal blocks 63. The write gap 32 is forced to again move along the path 58. The write head 27 is operated to overwrite the existing servo information along the path 58. The servo information establishing the first recording track 61 can be renovated in this manner. Whenever a defect of any servo signal block is found, the servo information is rewritten so as to renovate the servo signal block. Any defect of the servo information can completely be eliminated from the resultant magnetic recording disk 12.

Figure 10:
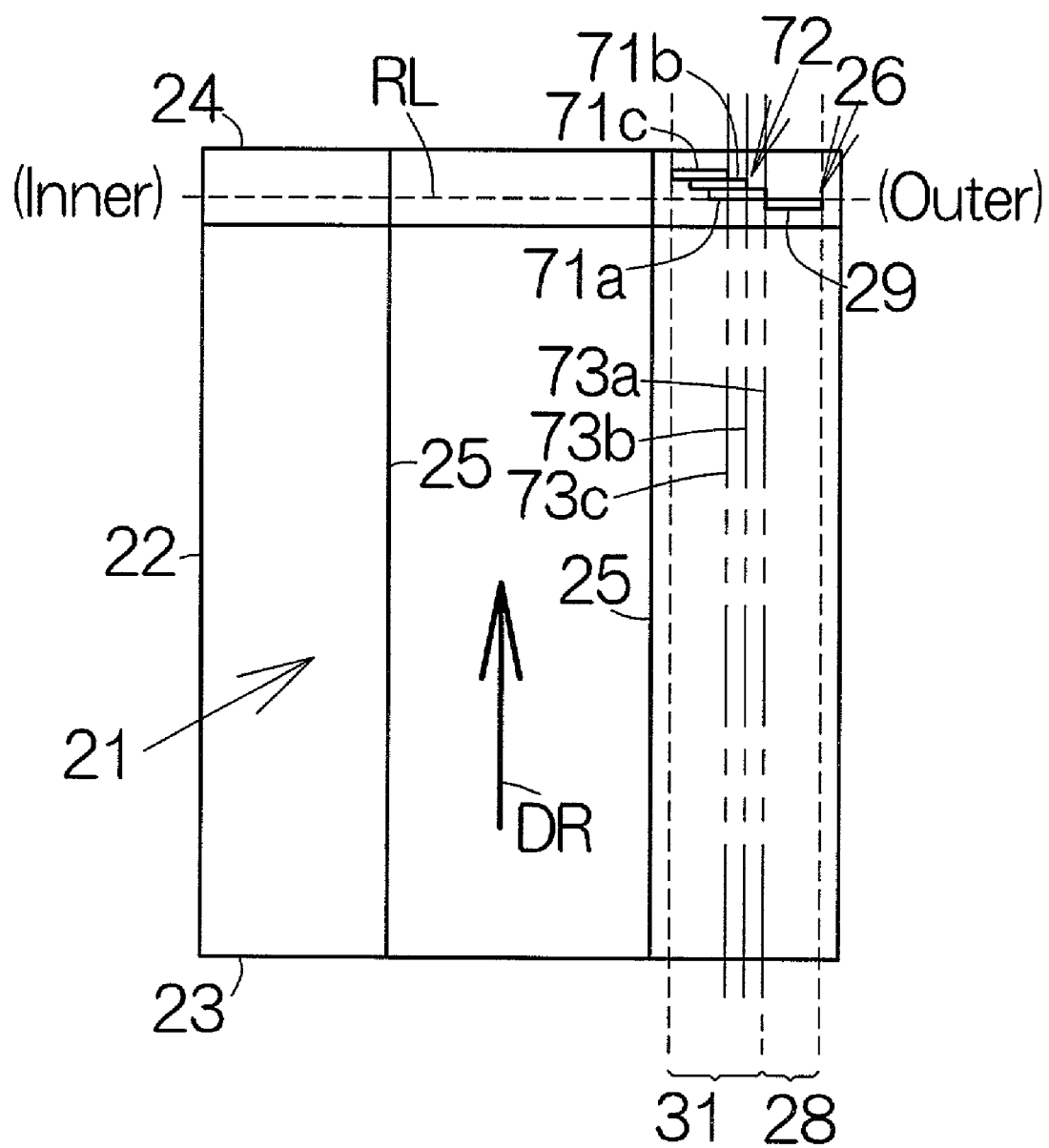
FIG. 10 is an enlarged plan view schematically illustrating the bottom surface of a flying head slider according to another specific example.

The aforementioned servo track writer 11 can be employed to establish servo patterns of a so-called phase type. As shown in FIG. 10, a write head array 72 should be mounted on the flying head slider 16 in the servo track writer 11 so as to expose a plurality of write gaps 71a, 71b, 71c out of the air bearing surface, for example. The write head array 72 may include a plurality of thin film magnetic heads exposing the write gaps 71a, 71b, 71c out of the air bearing surface in the aforementioned second longitudinal zone 31. The respective inner ends of the write gaps 71a, 71b, 71c are defined by straight datum lines 73a, 73b, 73c extending in parallel from the leading end 23 to the trailing end 24 on the slider body 22. The straight datum lines 73a, 73b, 73c are arranged in parallel at positions equally spaced from one another. The space or distance between the straight datum lines 73a, 73b, 73c corresponds to one third of the track pitch TP, as described later in detail. The like reference numerals are attached to structures identical or equivalent to that of the aforementioned slider body 22.

Figure 11:
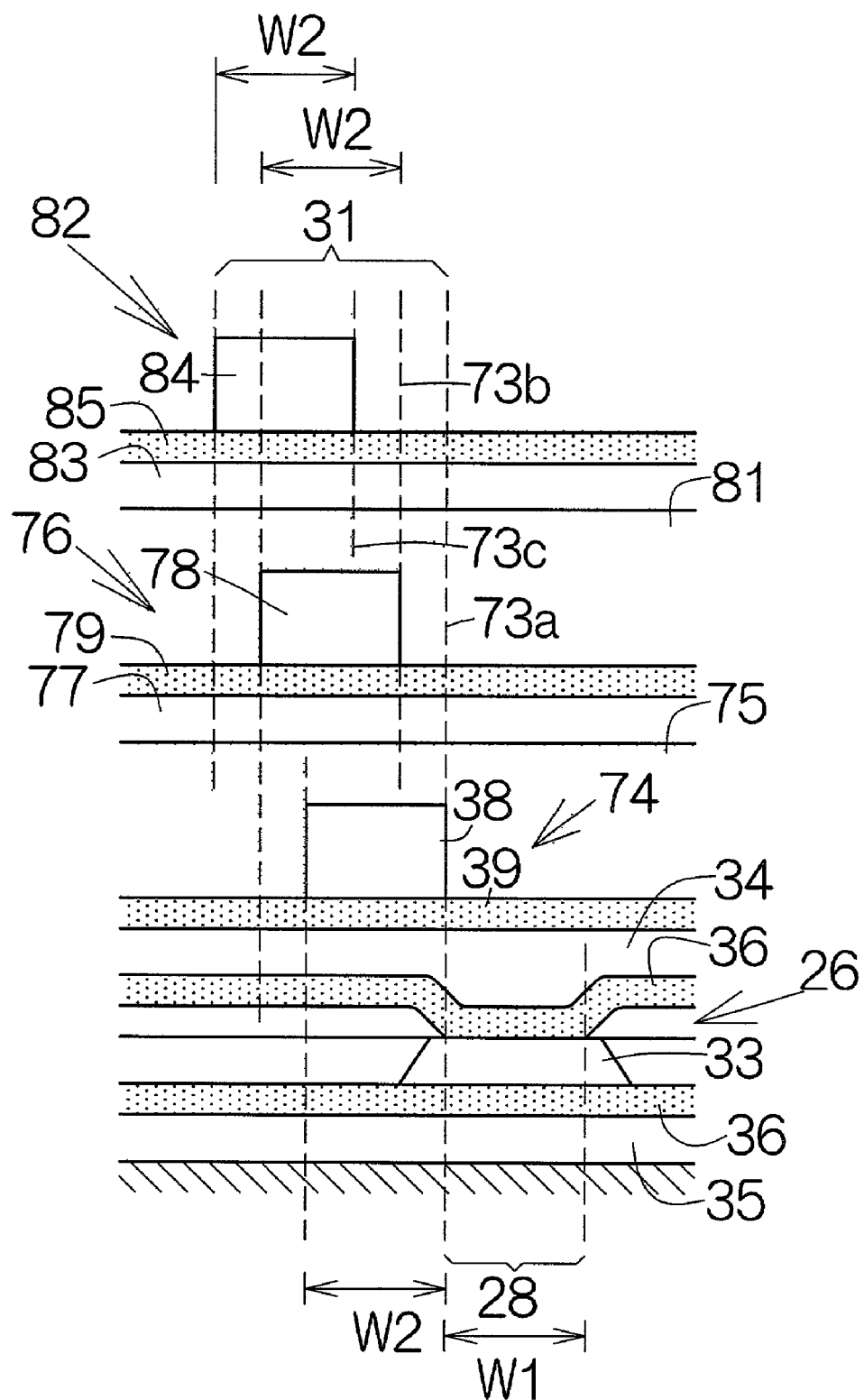
FIG. 11 is an enlarged partial plan view of the bottom surface for illustrating a write head array in detail.

As shown in FIG. 11, the write head array 72 comprises a group of thin film magnetic heads stacked on one another, for example. A first thin film magnetic head 74 includes an upper magnetic pole 38 opposed to the upper magnetic shield layer 34 of the read head 26 in the same manner as the aforementioned write head 27. A non-magnetic gap layer 39 is interposed between the upper magnetic pole 38 and the upper magnetic shield layer 34 so as to define the write gap 71a. The lateral length or width W2 of the write gap 71a can be defined by the lateral dimension of the primary range which is substantially related to formation of a magnetic field for recordation in the upper magnetic pole 38. The upper magnetic pole 38 is embedded within a non-magnetic layer 75.

A second thin film magnetic head 76 is stacked on the non-magnetic layer 75. The second thin film magnetic head 76 includes a lower magnetic pole 77 extending over a flattened upper surface of the non-magnetic layer 75, and an upper magnetic pole 78 opposed to the lower magnetic pole 77, for example. A non-magnetic gap layer 79 is interposed between the upper and lower magnetic poles 78, 77 so as to define the write gap 71b. The upper and lower magnetic poles 78, 77 are connected to each other through a magnetic piece, not shown, penetrating through the central area of a thin film coil pattern, not shown. The lateral length or width W2 of the write gap 71b can be defined by the lateral dimension of the primary range which is substantially related to formation of a magnetic field for recordation in the upper magnetic pole 78. The lateral dimension of the primary range for the upper magnetic pole 78 is set identical to the lateral dimension of the primary range for the aforementioned upper magnetic pole 38. The upper magnetic pole 78 is embedded within a non-magnetic layer 81.

A third thin film magnetic head 82 is stacked on the non-magnetic layer 81. The third thin film magnetic head 82 includes a lower magnetic pole 83 extending over a flattened upper surface of the non-magnetic layer 81, and an upper magnetic pole 84 opposed to the lower magnetic pole 83, for example. A non-magnetic gap layer 85 is interposed between the upper and lower magnetic poles 84, 83 so as to define the write gap 71c. The upper and lower magnetic poles 84, 83 are connected to each other through a magnetic piece, not shown, penetrating through the central area of a thin film coil pattern, not shown. The lateral length or width W2 of the write gap 71c can be defined by the lateral dimension of the primary range which is substantially related to formation of a magnetic field for recordation in the upper magnetic pole 84. The lateral dimension of the primary range for the upper magnetic pole 84 is set identical to the lateral dimension of the primary ranges for the aforementioned upper magnetic poles 38, 78. Moreover, the lateral dimension of the primary ranges for the upper magnetic poles 38, 78, 84 is set equal to the aforementioned width W1 of the read head 26.

Here, assume that servo information is to be written into the magnetic recording disk 12 in the aforementioned manner. First of all, the servo information is written to establish a datum track over the magnetic recording disk 12. The flying head slider 16 is positioned at the outermost position on the magnetic recording disk 12. The spindle motor 13 drives the magnetic recording disks 12 at the minimum vibration rotation speed.

The overall management circuit 46 first operates to allow the first thin film magnetic head 74 to write servo information. The servo data generating circuit 52 generates a servo data corresponding to servo patterns expected to establish the datum track. The generated servo data is supplied to the write signal processing circuit 53. The write signal processing circuit 53 provides the first thin film magnetic head 74 with electric signals designating the binary data included in the servo data. The write gap 71a serves to write into the magnetic recording disk 12 the binary magnetic data corresponding to the supplied electric signals.

Figure 12:
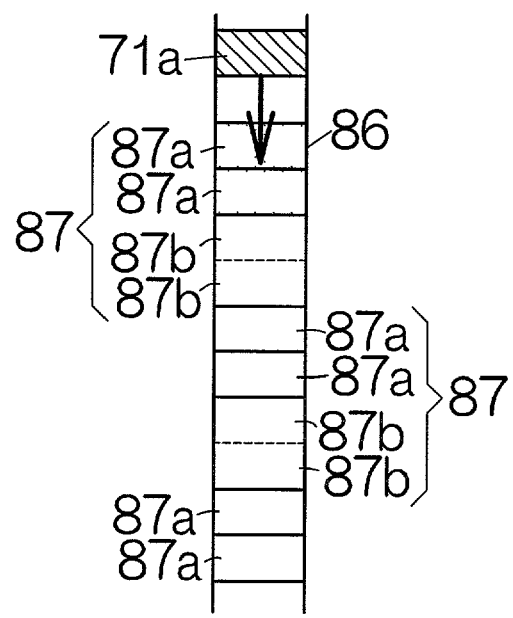
FIG. 12 is a schematic view illustrating a string of signal blocks established on a datum track.

As shown in FIG. 12, a string of signal blocks can be established on the magnetic recording disk 12 along the datum track 86. A plurality of data blocks 87 are contained within the string based on a linear resolution. In this case, two first magnetized blocks 87a and two second magnetized blocks 87b alternately appear. The magnetization is established over the first magnetized blocks 87a in the direction of the rotation of the magnetic recording disk 12, for example. To the contrary, the magnetization is established over the second magnetized blocks 87b in the direction opposite to the magnetization of the first magnetized blocks 87a, namely, in the direction reversal to the rotation of the magnetic recording disk 12.

The overall management circuit 46 then operates to allow the second thin film magnetic head 76 to write servo information. The write signal processing circuit 53 likewise provides the second thin film magnetic head 76 with electric signals designating the binary data included in the servo data. The write gap 71b serves to write into the magnetic recording disk 12 the binary magnetic data corresponding to the supplied electric signals.

Figure 13:
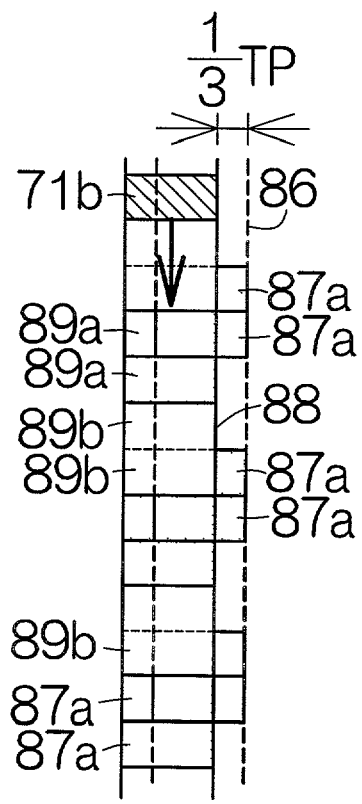
FIG. 13 is a schematic view illustrating a string of signal blocks offset from the datum track by one third of the track pitch.

The flying head slider 16 is kept at the aforementioned outermost position. The write gap 71b is accordingly allowed to move along a path 88 offset from the datum track 86 by one third of the track pitch TP, as shown in FIG. 13. The second thin film magnetic head 76 likewise operates to alternately establish two first magnetized blocks 89a and two second magnetized blocks 89b along the path 88. However, the arrangement of the first and second magnetized blocks 89a, 89b is shifted with respect to the arrangement of the first and second magnetized blocks 87a, 87b in the longitudinal direction by the length of the single data block 87. Specifically, the magnetization of the existing first and second magnetized blocks 87a, 87b is partly reversed.

The overall management circuit 46 then operates to allow the third thin film magnetic head 82 to write servo information. The write signal processing circuit 53 likewise provides the third thin film magnetic head 82 with electric signals designating the binary data included in the servo data. The write gap 71c serves to write into the magnetic recording disk 12 the binary magnetic data corresponding to the supplied electric signals.

Figure 14:
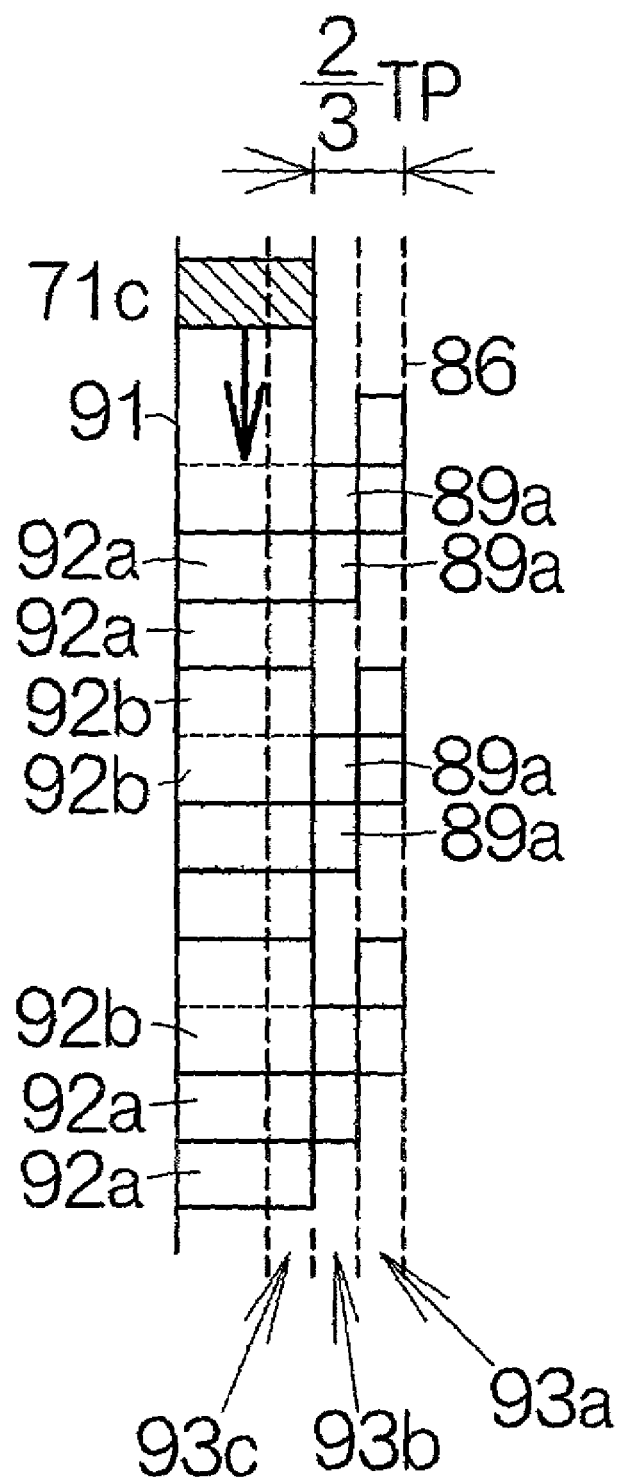
FIG. 14 is a schematic view illustrating a string of signal blocks offset from the datum track by two third of the track pitch.

The flying head slider 16 is still kept at the aforementioned outermost position. The write gap 71c is accordingly allowed to move along a path 91 offset from the datum track 86 by two third of the track pitch TP, as shown in FIG. 14. The third thin film magnetic head 82 likewise operates to alternately establish two first magnetized blocks 92a and two second magnetized blocks 92b along the path 91. However, the arrangement of the first and second magnetized blocks 92a, 92b is shifted with respect to the arrangement of the first and second magnetized blocks 89a, 89b in the longitudinal direction by the length of the single data block 87. Specifically, the magnetization of the existing first and second magnetized blocks 89a, 89b is partly reversed. In this manner, three strings 93a, 93b, 93c of the signal blocks are established over the datum track 86.

Thereafter, the overall management circuit 46 operates to position the read gap 29 right above the datum track 86. The rotation speed of the spindle motor 13 is set at the maximum driven speed. The read head 26 follows the datum track 86 based on the aforementioned servo patterns, namely, strings 93a, 93b, 93c of the signal blocks. If the read gap 29 moves right on the datum track 86, the read head 26 is allowed to receive the magnetic field of which the intensity increases and decreases periodically. Specifically, when the read gap 29 shifts from one row of the first magnetized block to two rows of the first magnetized blocks, a rise of the intensity can be detected in the applied magnetic field. On the other hand, when the read gap 29 shifts from two rows of the first magnetized blocks to one row of the first magnetized block, a drop of the intensity can be detected in the applied magnetic field. If the read gap 29 deviates from the datum track 86 outward in the radial direction of the magnetic recording disk 12, a rise of the intensity can be detected earlier than expected. The control quantity of the positioning mechanism 18 can be determined based on this phase shift. When the linear movement arm 17 is driven to move by the determined control quantity, it is possible to counteract the deviation of the read head 26 from the datum track 86. To the contrary, if the read gap 29 deviates from the datum track 86 inward, a rise of the intensity appears later than expected. When the positioning mechanism 18 is allowed to drive the linear movement arm 17 by the control quantity corresponding to the phase shift, the deviation of the read head 26 can likewise be counteracted. The servo control in this manner allows the read gap 29 to accurately follow the datum track 86.

Figure 15:
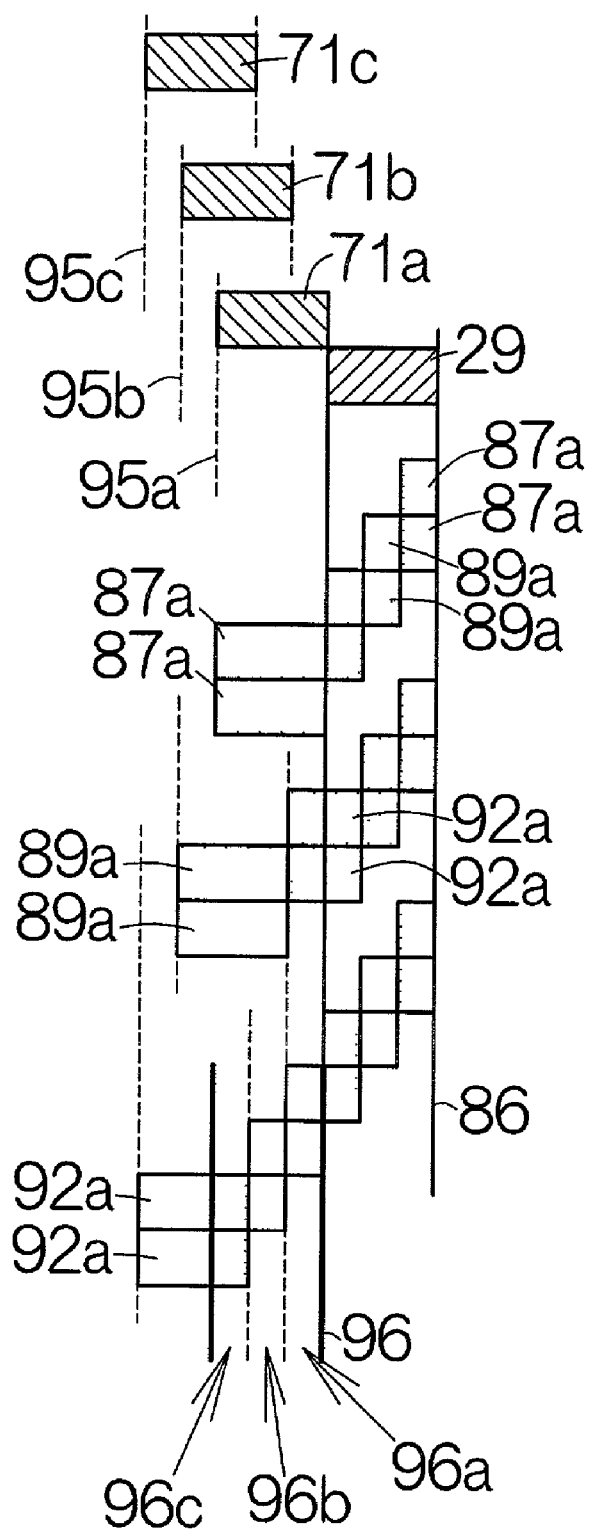
FIG. 15 is a schematic view illustrating establishment of three strings of signal blocks for a single recording track.

While the read gap 29 follows the datum track 86 in the aforementioned manner, the write gaps 71a, 71b, 71c respectively moves along paths 95a, 95b, 95c in parallel with the datum track 86 inside the datum track 86, as shown in FIG. 15. The paths 95a, 95b, 95c are located offset from one another by one third of the track pitch TP. The overall management circuit 46 then operates to allow the first thin film magnetic head 74 to write servo information. The first thin film magnetic head 74 writes the servo information into the magnetic recording disk 12 so as to establish the aforementioned first and second magnetized blocks 87a, 87b along the path 95a during movement from the beginning to the end of a single track, in other words, during a single rotation of the magnetic recording disk 12.

After the first and second magnetized blocks 87a, 87b have been established, the overall management circuit 46 operates to allow the second thin film magnetic head 76 to write servo information. The second thin film magnetic head 76 writes the servo information into the magnetic recording disk 12 so as to establish the aforementioned first and second magnetized blocks 89a, 89b along the path 95b during movement from the beginning to the end as described above. Thereafter, the third thin film magnetic head 82 writes the servo information into the magnetic recording disk 12 so as to establish the aforementioned first and second magnetized blocks 92a, 92b along the path 95c during movement from the beginning to the end. In this manner, three strings 96a, 96b, 96c of the signal blocks are established insider the datum track 86 so as to form a first recording track 96.

In this case, the read gap 29 is allowed to reliably follow the datum track 86 based on the aforementioned servo control irrespective of the vibration or eccentricity of the driving shaft 14 in the same manner as described above. As long as the servo control is maintained, the write gaps 71a, 71b, 71c are forced to move along the paths 95a, 95b, 95c, respectively. Since the offset amount between the paths 95a, 95b, 95c can be maintained constant, any superposition or interference can reliably be prevented between three strings 96a, 96b, 96c, . . . , for establishing the respective tracks 96, . . . , over the magnetic recording disk 12. Moreover, since the first and second magnetized blocks 87a, 87b, 89a, 89b, 92a, 92b can be established over the magnetic recording disk 12 at a higher accuracy irrespective of the vibration or eccentricity of the driving shaft 14, it is possible to reliably keep a constant track pitch TP between the adjacent tracks 96, . . . , on the magnetic recording disk 12. In this manner, a plurality of tracks 96, . . . , can sequentially be established inside the datum track 86. Any superposition or interference cannot happen between the adjacent resultant tracks. Furthermore, a defect of the servo information, namely, of the strings 96a, 96b, 96c can be detected while the read gap 29 follows the respective tracks, in the same manner as described above.

Writing of the servo information related to establishment of the first and second magnetized blocks 87a, 87b, 89a, 89b, 92a, 92b along the paths 95a, 95b, 95c is switched over in the aforementioned servo track writer 11 after the read gap 29 has thoroughly followed the datum track 86 from the beginning to the end. Alternatively, the establishment of the first and second magnetized blocks 87a, 87b, 89a, 89b, 92a, 92b along the paths 95a, 95b, 95c may be completed while the read gap 29 once follows the datum track 86 from the beginning to the end. In the latter case, the supply of the electric signals may sequentially be switched over between the first to third thin film magnetic heads 74, 76, 82 during a single rotation of the magnetic recording disk 12. Writing of three strings 96a, 96b, 96c of the data blocks can be completed during a single rotation of the magnetic recording disk 12 in this case. Establishment of a complete track can be realized during a single rotation of the magnetic recording disk 12.

Any writing apparatus can be employed to establish the datum track 57, 86 in place of the aforementioned servo track writer 11. It is preferable to write the servo information for the datum tracks 57, 86 at a still higher accuracy. Otherwise, numbers of the datum tracks 57, 86 may be established over a single magnetic recording disk 12. Besides, writing of the servo signals may be shifted outward from a datum track established at the innermost position of the magnetic recording disk 12.

A swinging arm may be employed in place of the linear movement arm 17 in the aforementioned servo track writer 11. The swinging arm is allowed to move the flying head slider 16 along an arc of a moderate curvature in the radial direction of the magnetic recording disk 12. Still, the bottom surface 21 of the flying head slider 16 can be formed in any shape other than the aforementioned one. The flying head slider 16 may be replaced with a head slider of any other type such as a contact head slider.

What is claimed is:

1. A writer for head positioning information, comprising:
a head slider;
a read head mounted on the head slider in a first zone extending straight from a leading end to a trailing end and reading head positioning signals out of a head positioning pattern over a recording medium;
a write head mounted on the head slider in a second zone extending straight from the leading end to the trailing end in parallel with the first zone and writing the head positioning information into the recording medium, a distance between a centerline of the first zone and a boundary of the second zone corresponding to a track pitch of tracks defined over the recording medium;
a spindle motor driving the recording medium for rotation around a rotation axis at a first rotation speed when the write head writes the head positioning information of a first track over a new recording medium, said spindle motor driving the recording medium for rotation around the rotation axis at a second rotation speed higher than the first rotation speed when the write head writes the head positioning information of a track other than the first track; and
a positioning mechanism connected to the head slider, said positioning mechanism positioning the head slider at a predetermined position when the write head writes the head positioning information of the first track, said positioning mechanism positioning the head slider based on the head positioning signals read with the read head when the write head writes the head positioning information of the track other than the first track.

2. The writer according to claim 1, wherein said write head exposes a plurality of write gaps at a medium-opposed surface.

3. The writer according to claim 2, wherein respective ends of the write gaps are respectively defined by a plurality of straight datum lines extending in parallel from a leading end to a trailing end on said head slider.

4. The writer according to claim 3, wherein said positioning mechanism moves the head slider on a straight line.

5. The writer according to claim 1, further comprising a verifying circuit detecting a defect of the head positioning information based on a detection signal of the read head.

6. A head slider comprising:
a slider body defining a medium-opposed surface;
at least a rail formed on the medium-opposed surface;

a read head element exposing a read gap on the rail in a first zone extending straight from a leading end to a trailing end; and a write head element exposing a write gap on the rail in a second zone extending straight from the leading end to the trailing end in parallel with the first zone, a distance between a centerline of the first zone and a boundary of the second zone corresponding to a track pitch of tracks defined over a recording medium.

7. A head slider comprising:

a slider body defining a medium-opposed surface;

a read head element exposing a read gap at the medium-opposed surface in a first zone extending straight from a leading end to a trailing end; and a head array exposing a plurality of write gaps at the medium-opposed surface in a second zone extending straight at a position adjacent the first zone from the leading end to a trailing end, adjacent ones of the write gaps being shifted from each other by one-third of a track pitch, the track pitch being defined between adjacent tracks over a recording medium.

8. A method of writing head positioning information, using a head slider having a read head and a write head, the read head mounted on the head slider in a first zone extending straight from a leading end to a trailing end, the write head mounted on the head slider in a second zone extending straight from the leading end to the trailing end in parallel with the first zone, a distance between a centerline of the first zone and a boundary of the second zone corresponding to a track pitch of tracks defined over a recording medium, said method comprising:

driving the recording medium without the head positioning information for rotation around a rotation axis at a first rotation speed;

positioning the write head at a predetermined position over the recording medium, so that the write head writes the head positioning information of a first track over the recording medium;

driving the recording medium for rotation around the rotation axis at a second rotation speed higher than the first rotation speed after the head positioning information of the first track is established; and forcing the read head to follow a predetermined datum track based on the head positioning information established over the recording medium, so that the write head writes the head positioning information of a track adjacent to the predetermined datum track.

9. A method of writing head positioning information, comprising the step of forcing a read head to follow a predetermined datum track established by head positioning signals over a recording medium so as to write the head positioning information into the recording medium over an area off the predetermined datum track along one or more paths extending in parallel with the predetermined datum track, wherein writing of the head positioning information is switched between the paths while the read head follows the predetermined datum track from a beginning of said predetermined datum track to an end of said predetermined datum track.

10. The method according to claim 8, wherein writing of the head positioning information is switched between the paths after the read head has followed the predetermined datum track from a beginning of said predetermined datum track to an end of said predetermined datum track.

11. The method according to claim 8, further comprising:

positioning the read head on a track established based on the head positioning information written into the recording medium; and forcing the read head to follow the track so as to detect a defect of the head positioning information based on a detection signal of the read head.

12. The method according to claim 11, further comprising positioning the read head on the predetermined datum track so as to overwrite the head positioning information along the path or paths.

13. The method according to claim 8, wherein the predetermined datum track is the first track established over the recording medium.

14. A writer for head positioning information, comprising:

a head slider defining a medium-opposed surface;

at least a rail formed on the medium-opposed surface;

a read head mounted on the head slider and exposing a read gap on the rail in a first zone extending straight from a leading end to a trailing end, said read head reading head positioning signals out of a head positioning pattern over a recording medium;

a write head mounted on the head slider and exposing a write gap on the rail in a second zone extending straight from the leading end to the trailing end in parallel with the first zone, said write head writing the head positioning information into the recording medium so as to establish a new head positioning pattern, a distance between a centerline of the first zone and a boundary of the second zone corresponding to a track pitch of tracks defined over the recording medium; and a positioning mechanism connected to the head slider and positioning the head slider based on the head positioning signals read with the read head.

15. A head slider comprising:

a slider body defining a medium-opposed surface;

a read head element exposing a read gap at the medium-opposed surface in a first zone extending straight from a leading end to a trailing end; and a head array exposing a plurality of write gaps at the medium-opposed surface in a second zone extending straight at a position adjacent the first zone from the leading end to the trailing end, wherein respective ends of the write gaps are respectively defined by plurality of straight datum lines extending in parallel from the leading end to the trailing end on said head slider, and adjacent ones of the plurality of straight datum lines are spaced from each other by a distance which is one-third of a track pitch, the track pitch being defined between adjacent tracks over a recording medium.

16. The writer according to claim 1, wherein said write head at the predetermined position writes the head positioning information of a track nearest to the rotation axis or of a track furthest from the rotation axis.

* * * * *

UNITED STATES PATENT AND TRADEMARK OFFICE
CERTIFICATE OF CORRECTION

PATENT NO. : 7,012,775 B2 Page 1 of 1
DATED : March 14, 2006
INVENTOR(S) : Hiroyuki Suzuki et al.

It is certified that error appears in the above-identified patent and that said Letters Patent is hereby corrected as shown below:

<u>Column 16,</u>
Line 50, delete "plurality" and insert -- a plurality --.

Signed and Sealed this

Twenty-third Day of May, 2006

JON W. DUDAS
*Director of the United States Patent and Trademark Office*